Feb. 5, 1935.　　　　R. S. FALKINER ET AL　　　1,990,172
HARVESTING OF SUGAR CANE
Filed April 14, 1930　　3 Sheets-Sheet 1
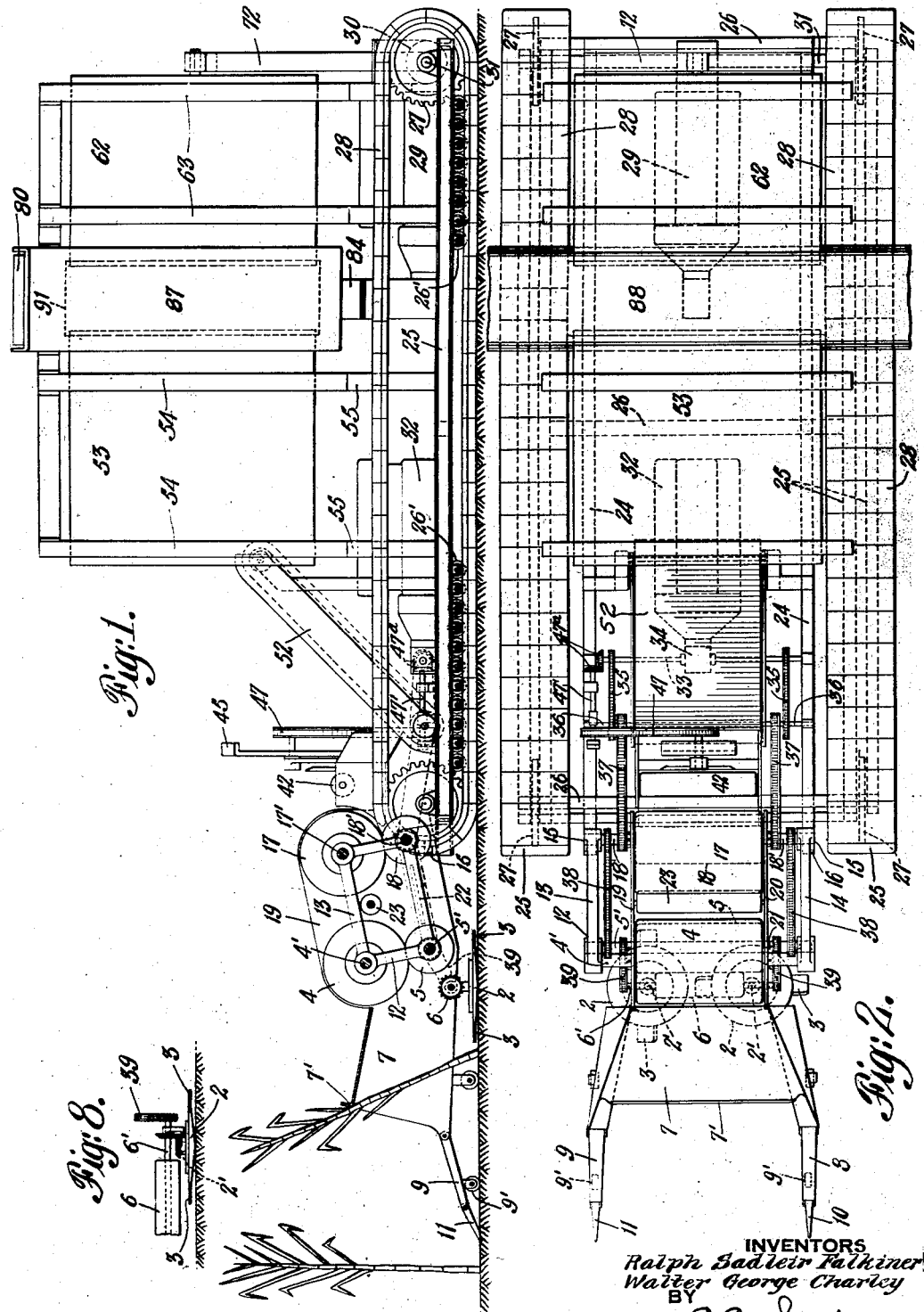
INVENTORS
Ralph Sadleir Falkiner
Walter George Charley
BY
E. C. Sanborn
ATTORNEY

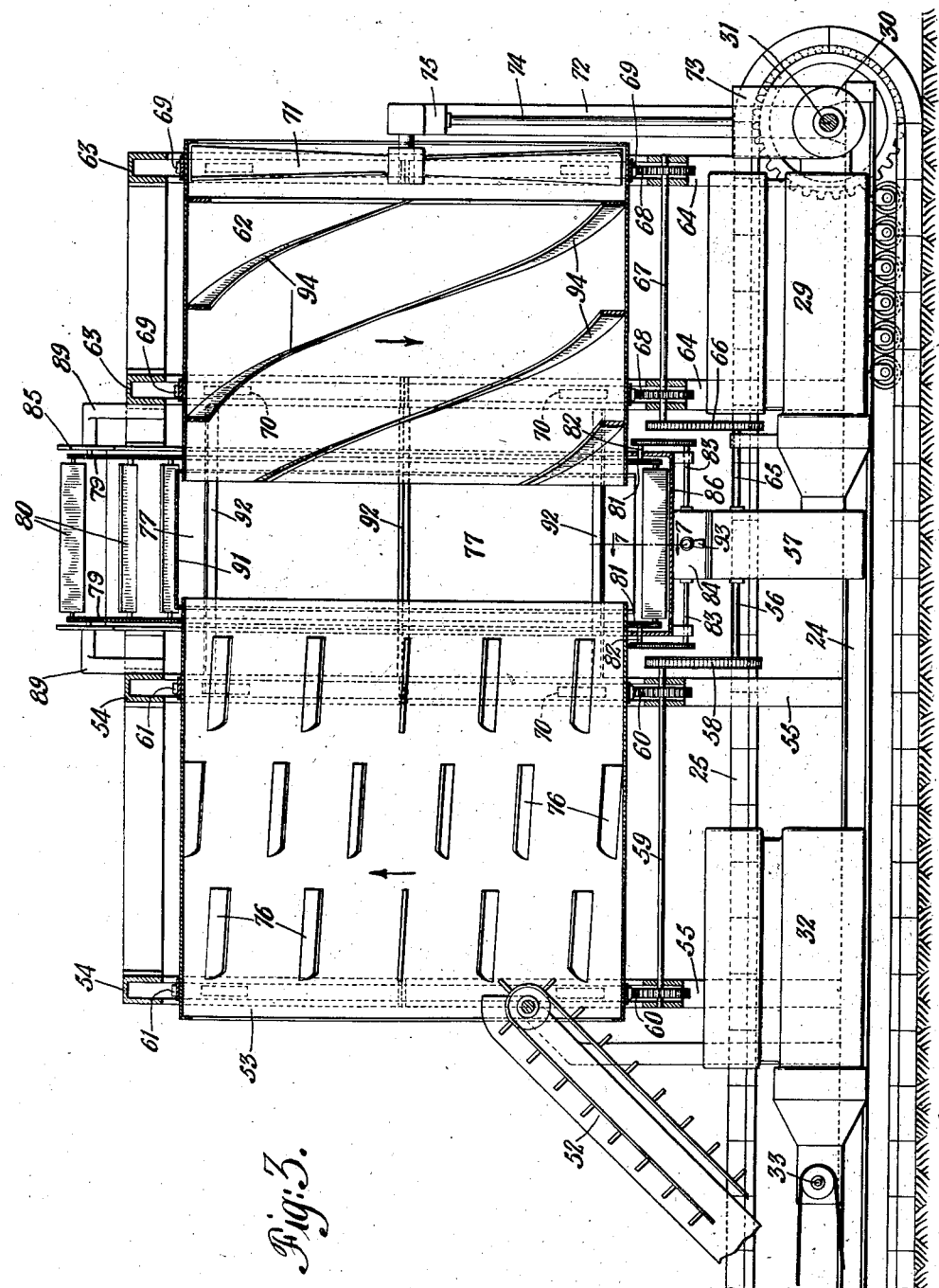

Feb. 5, 1935.  R. S. FALKINER ET AL  1,990,172
HARVESTING OF SUGAR CANE
Filed April 14, 1930   3 Sheets-Sheet 3
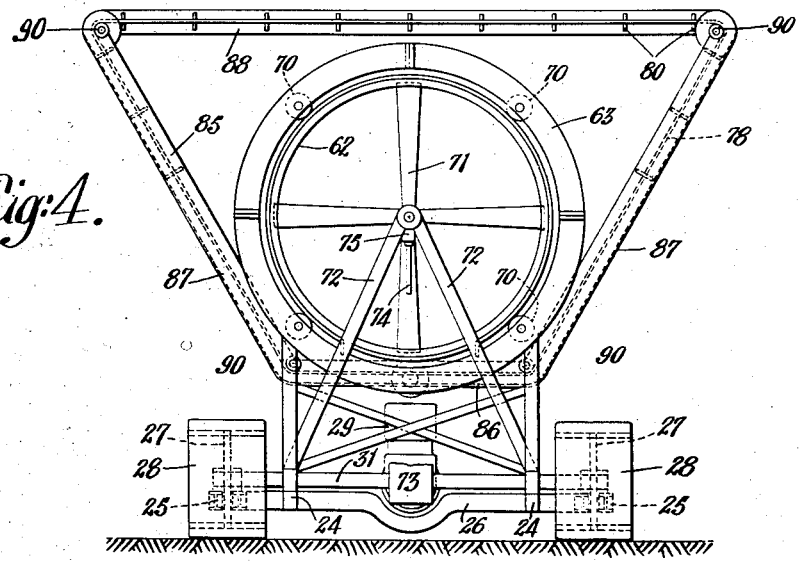
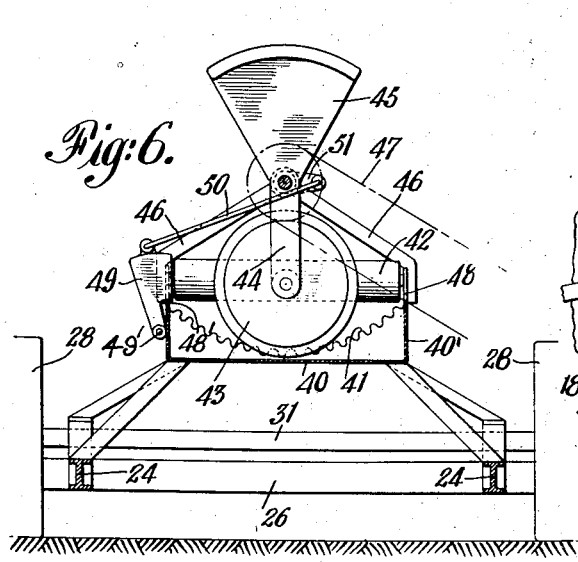
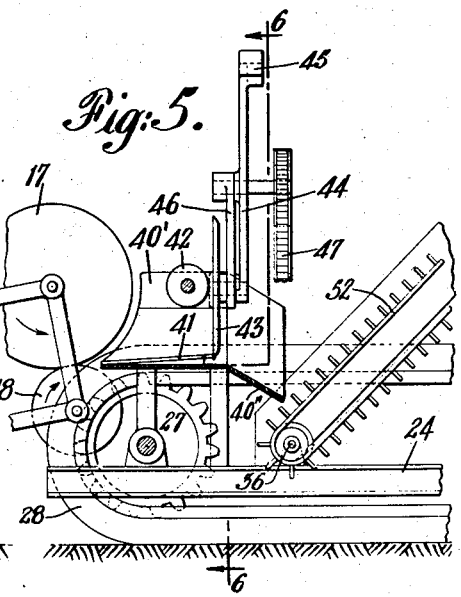
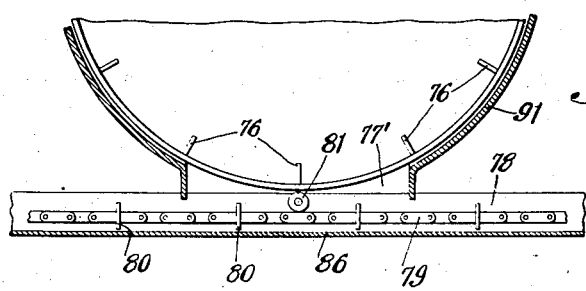
INVENTORS
Ralph Sadleir Falkiner
Walter George Charley
BY
E. C. Sanborn
ATTORNEY Patented Feb. 5, 1935

1,990,172

UNITED STATES PATENT OFFICE 1,990,172

HARVESTING OF SUGAR CANE

Ralph Sadleir Falkiner and Walter George Charley, Melbourne, Australia, assignors, by direct and mesne assignments, to Falkiner Cane Harvester Corporation of America, New York, N. Y.

Application April 14, 1930, Serial No. 443,999½

5 Claims. (Cl. 209—153)

This invention relates to means for harvesting sugar cane. One of the objects of the invention is the provision of an improved and highly efficient method of and means for effecting the separation of the good cane from the leaves, tops, and other attendant trash. Another object is to provide improved means enabling the means for severing the cane from the ground to accommodate itself to ground inequalities. A further object is the provision of improved means for chopping the cane, trash, and leaves into predetermined lengths. Other features of the invention will be hereinafter described and claimed.

In the accompanying drawings:

Fig. 1 is a view partly in side elevation, and partly in vertical section, showing cane harvesting mechanism comprising an embodiment of our invention.

Fig. 2 is a top plan view thereof.

Fig. 3 is a view partly in vertical section and partly in side elevation, and on an enlarged scale, showing the means for separating the good cane from the tops, leaves and trash.

Fig. 4 is a view in rear elevation of the machine shown in Figs. 1 and 2.

Fig. 5 is a detail view partly in section and partly in elevation, of the cane chopping mechanism.

Fig. 6 is a view taken on line 6—6 of Fig. 5.

Fig. 7 is a sectional detail view taken on line 7—7 of Fig. 3.

Fig. 8 is another view of a detail.

Referring to the drawings there are shown at 2, 2 a pair of rotatable disks, each carrying a pair of knives 3, 3, for severing the cane from the ground. These knives and disks may be the same as those disclosed in our pending application for U. S. Patent, No. 386,125, filed Aug. 15, 1929 and in our pending application for British Patent No. 27526 of 1929; said knives being adapted to sever the cane at or below ground level. Above said knives a pair of superposed gripping rollers 4, 5, are mounted both of which may be pneumatic, although preferably the upper one only is pneumatic, while the lower is of hard material such as steel and of a smaller diameter. In front of the lower roller 5, and in proximity to the ground knives, a roller 6 of smaller diameter is mounted, this roller preferably having a roughened surface. In front of the rollers 4, 5, and 6 is a forwardly projecting hood or fender 7 provided on each side with a hinged gathering horn 8, 9, each mounted on a roller 9'; the extreme ends of said horns being in the form of hinged spring controlled stump jumping fingers 10, 11. The rollers 4, 5, are mounted in a frame 12 comprising two pairs of parallel radius rods, 13, 14, one pair on each side of the machine. The shafts 4', 5' of the respective rollers 4, 5, are journalled in the frame 12, as are also the shafts 17', 18' of a pair of rollers 17, 18, similar to the rollers 4, 5, and positioned to the rear thereof. The fender 7 is secured to the frame 12 in any suitable way as, for example, by means of rearward extensions 19, 20, which are positioned at opposite sides of the frame 12, and through which are passed the various roller shafts 4', 5', 17', 18'; said extensions 19, 20 being prevented from moving laterally on said shafts in any suitable way as by means of collars 21 pinned to said shafts. The shaft 18' of the lower roller 18 is journalled in brackets 15 on the main frame 16 of the machine, whereby the frame 12 and the parts carried thereby are capable of pivotal movement as a unit about the axis of said shaft 18'. It will be seen that through the pivotal mounting of frame 12 aforesaid, movement of the latter in a vertical plane independently of the main frame of the machine is permitted, thereby permitting the ground knife disks 2, 2 to negotiate uneven ground conditions, while at the same time the rollers 4, 5, 6, 17, and 18 are maintained in a fixed relationship to each other. Also, due to said pivotal mounting, the frame 12, together with the parts carried thereby, may be raised out of contact with the ground for facilitating transport or turning of the machine. Any suitable means for raising and lowering the frame 12 for purposes of transport may be employed.

Suitably mounted in the frame 12 between the lower rollers 5, 18, as by being secured to the members 19, 20, is a guide plate 22, which prevents cane from falling between said rollers. A smaller guide roller 23 may be mounted above the rollers 4, 17, as shown.

The main frame 16 of the machine comprises longitudinally extending beams 24, 24, which may be supported in any suitable way from caterpillar trucks 25, 25, as by means of cross rods 26, 26. Each truck carries guide wheels 26' as well as a driver or sprocket wheel 27 engaging the associated caterpillar or endless track 28. The sprocket wheels may be driven by an engine 29 through suitable gearing in the box 30 and through shaft 31 on which said wheels are mounted. A separate engine 32 may be employed for driving the disks 2 and the rollers aforesaid through any suitable connections. For example, as shown, the engine 32 may drive a shaft 33 through gearing in box 34; the shaft 33 driving, through chains 35, a shaft 36, and the latter, through chains 37, driving the shaft 18'. Turning of shaft 18' rotates the roller 18 secured thereto, as well as the upper roller 17. Shaft 18', through chains 38, drives shaft 5' of roller 5, thereby rotating that roller together with upper roller 4. Shaft 5' turns the shaft 6' of roller 6 through chains 39. The shafts 2', 2' of the knife disks 2, 2, which shafts are mounted in suitable bearings on the frame 12, may be rotated from shaft 6' through suitable gearing as indicated in Fig. 8.

The knives 2, 2, operate to cut the standing cane and by virtue of the contacting of the upper forward edge 7' of fender 7 with the cane as the machine travels forwardly, the cane is caused to pass butts first into engagement with the rollers carried by frame 12. The roller 6 aids in feeding the cane into position for passing between the rollers 4, 5, whence it is further passed between the rear pair of rollers 17, 18. With the cane travel, of course, the leaves and attendant trash. It will be evident that in lieu of the roller 6 a short elevator may be employed for passing the cane into the rollers 4, 5.

The chopping or chaffing mechanism includes a stationary knife or dead plate 40 carried on the main frame of the machine and positioned to the rear of the roller 17. This plate is preferably corrugated longitudinally as indicated at 41. A small roller 42 is mounted in side members 40' extending upwardly from plate 40, said roller being positioned at a suitable distance to allow cane to pass between it and said plate. Carried by a crank plate 44 which is suitably balanced by counterweight arm 45 and is mounted for rotation about a horizontal axis in a standard 46, is a circular or disk knife 43 arranged to sweep across the rear edge of the dead plate 40 so that as the cane, trash and leaves are fed to the rear edge of said plate said disk knife sweeps round and chaffs or chops them. While said knife 43 may be positively rotated about its pivotal connection to the crank plate 44, I have shown said knife as simply free to rotate on said plate, the latter being driven at a predetermined speed in relation to the feed of the gripping rollers so as to cut the cane, leaves and trash into predetermined lengths. The crank plate may be driven in any convenient way from the engine, as through a chain drive 47, shaft 47', and gears 47a, from shaft 33. The knife 43 passes through slots 48, 48' in the sides 40' of the dead plate.

Arranged at the side of the dead plate at which the knife finishes its cut is an anti-choke device comprising an oscillating plate 49 which works in the slot 48'. This plate is pivotally mounted at 49' on the adjacent side of the dead plate and is oscillated from the crank plate 44 in any suitable way as by a connecting rod 50 and rocker arm 51; said connections being so arranged that the plate 49 is in its outward position away from the knife 44 as the latter passes through the slot 48'. As the knife continues its movement the plate 49 is moved inwardly in the slot 48' and pushes any material carried up by the knife back into the stream of cane passing over the dead plate. The corrugations 41 aid in preventing the cane from being pushed laterally under the influence of the knife during its passage.

Immediately behind and below the dead plate 40 and arranged to receive the cut cane from a downwardly directed rear portion 40'' of said plate is an elevator 52, which may be of any usual type, such as an endless band conveyor fitted with slats, teeth, or the like for carrying the cut cane, leaves, and trash along. Said elevator 52 may be driven from engine 32 in any convenient way as by wheels on the shaft 36 engaging said conveyor. Through the conveyor 52 the cut cane leaves and trash are carried to the separating mechanism.

The mechanism for separating the good cane from the tops, leaves, and trash comprises a drum 53 mounted for rotation about a horizontal axis. As shown, said drum may be rotatably mounted in brackets 54, 54 fixed to standards 55, 55 which rise from the beams 24, 24 of the main frame. Said drum may be rotated in any suitable way by the engine 29, as, for example, through shaft 56 driven from said engine through suitable gearing in box 57, chain or belt 58, shaft 59, gears 60, 60 on said shaft, and annular racks 61, 61 on said drum engaged by the respective gears 60, 60. To the rear of the drum 53 there is positioned a drum 62, also mounted for rotation about a horizontal axis as by means of brackets 63, 63, secured to standards 64, 64 rising from beams 24, 24. The drum 62 is preferably rotated in the direction opposite to that in which drum 53 is rotated. Drums 62 may be driven in said opposite direction from engine 29 through suitable gearing in box 57, shaft 65, chain or belt 66, shaft 67, and gears 68, 68 on said shaft meshing respectively with annular racks 69, 69 on said drum. Each of the brackets 63, 63 may carry rollers 70 for engaging the drum 62 as indicated in Fig. 4, and similarly the brackets 54, 54 may carry rollers contacting with drum 53. Positioned within the rearward extremity of drum 62 is a fan 71, rotatably supported in a frame comprising standards 72, 72 (Fig. 4) projecting upwardly from beams 24, 24. Said fan is driven from engine 29 in any suitable way as by gearing in the box 73, shaft 74, and gearing in box 75. By rotation of said fan a continuous current of air is drawn rearwardly through the drums 53, 62 and is discharged at the rear of the machine.

The drum 53 is provided on its interior with a series of slats or paddles 76, preferably arranged with a slight helical inclination. As the cut up cane, leaves, tops, and trash are transferred by the elevator 52 to the interior of the drum 53 they come under the influence of the air current induced by the rotating fan 71. This immediately removes a large portion of the leaves, tops, and trash or other material lighter than the pieces of good cane; said leaves, tops, and trash being drawn through the fan and discharged at the rear of the machine. The remaining pieces comprising the good cane and such adhering lighter particles as have not been removed immediately by the air current, fall into the drum, which in rotating carries them up the side by means of the slats or paddles 76 and drops them through the air stream repeatedly, thus insuring thorough separation of the leaves, tops and other trash from the good cane. The slight helical inclination of the paddles 31, in conjunction with the air stream, insures the feeding of the cane rearwardly to a discharge space 77 between the drums 53 and 62.

Below the discharge space 77 there is mounted a conveyor 78 for transporting the cut cane from the machine to wagons or carts positioned to the side of the machine when in operation. Said conveyor may comprise sprocket chains 79, 79 carrying slats 80 for receiving and transporting the pieces of cane. The conveyor may be driven in any suitable way from engine 29, as, for example, through sprocket wheels 81, 81 on shafts 82, 82, operated through chains from shafts 83, 83 which are actuated from the engine by suitable gearing in the box 84.

Suitably supported from the beams 24 is a frame 85 which, as shown in Figs. 3 and 4, comprises a lower horizontal portion 86 extending transversely of the machine below the space 77 between the drums 53, 62. Said frame further comprises two portions 87, 87, extending upwardly from opposite ends of the portion 86, and a horizontal section 88 extending above the drums 53, 62, and connecting the upper ends of the portions 87, 87. The frame 85 may conveniently be supported through standards similar to standards 64 or 55 rising from beams 24, 24 and connected to portion 86, as well as through extensions 89 from the adjacent brackets 54, 63, as shown in Fig. 3. Said frame 85 is provided with guide wheels 90 (Fig. 4) over which is passed the conveyor 78.

The opening 77 between the drums 53, 62, is covered, except for a space 77' for the discharge of the cane, by a hood 91, which may be supported from the adjacent brackets 54, 63 through suitable extensions thereof such as indicated at 92, 92. The opening 77', in addition to providing for the discharge of the cut pieces of cane from the drum 53 and on to the conveyor 78, also permits an upward current of air to flow therethrough under the influence of the suction created by fan 71. Any remaining trash, leaves and tops are thereby separated from the cane and are drawn through the fan and discharged from the machine.

The connections for operating the conveyor 78 may be reversible so as to drive said conveyor in either of opposite directions and thus discharge the cane on either side of the machine as desired. Any well-known or convenient reversing connections may be employed and need not be here described. A handle for controlling the direction of operation of the conveyor 78 is indicated at 93.

The drum 62 is provided with helical fins or vanes 94 which are arranged to feed back to the opening 77 any good cane which may have been carried past said opening and into said drum. As has been mentioned, the drum 62 is rotated in the opposite direction from that in which drum 53 is rotated. The object of this is as follows: As the cane, leaves, and trash are fed into the drum 53 they are carried up by the paddles 76 on one side only of the drum, i. e., in the direction of rotation. On this account the major portion of the tops, leaves, and trash is traveling to the fan on one side only, leaving the other side with comparatively clean air. Any cane carried over into the drum 62 is carried up by the helical vanes 94 on the side opposite to that on which the cane is carried upwardly in the first drum, and thus the cane in the second drum is subjected to the influence of the clean air above mentioned.

By the term trash, as employed in the ensuing claims, we intend to refer to any material such as leaves, tops, or extraneous matter lighter than the good cane.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

We claim:

1. In a cane harvesting apparatus, a drum for receiving cane and trash, means for inducing an air current through said drum, means carried by said drum for elevating and dropping the cane and trash through said air current, and feeding cane through one end of said drum, means at said end of the drum for conveying the cane to a discharge point, and a second drum positioned for receiving cane and trash carried by said air current from the first drum, said second drum being constructed and arranged to feed back to said conveying means cane carried by said air current from the first drum.

2. In a cane harvesting apparatus, a knife, a rotatable member upon which said knife is mounted, a compartment having a slot therein, means for feeding cane to said compartment, means for rotating said element for causing said knife to cut cane in said compartment and thence to pass outwardly through said slot, an antichoke element, and connections between said element and said rotatable member for entering said element with said slot during a portion of the rotation of said member.

3. In a cane harvesting apparatus, a drum for receiving cane and trash, means whereby the cane and trash are elevated and dropped within said drum, means for inducing an air current through said drum comprising a fan, and a second drum aligned with the first drum and constructed and arranged to feed back to a point between the drums cane carried beyond the first drum, said drums being open at both ends and said fan being located at the opposite end of the second drum from the first drum.

4. In a cane harvesting machine, means for chopping cane, a rotary drum, means for conveying the pieces of cane and trash from the chopping means and delivering them to said drum, means for causing a current of air to flow through said drum, means within said drum for elevating and dropping the cane and trash through said current, and means for removing pieces of cane from said drum.

5. The herein described method of harvesting cane which consists in cutting the stalks into lengths, tumbling them about for severing the leaves from the stalks, and in alternately raising and then letting the stalks and leaves fall repeatedly through a blast of air strong enough to remove the severed leaves from the stalks.

RALPH SADLEIR FALKINER.
WALTER GEORGE CHARLEY.